United States Patent

Karube et al.

Patent Number: 5,343,013
Date of Patent: Aug. 30, 1994

[54] LASER BEAM MACHINE

[75] Inventors: Norio Karube, Machida; Yasuyuki Morita, Minamitsuru, both of Japan

[73] Assignee: Fanuc Ltd., Minamitsuru, Japan

[21] Appl. No.: 860,520

[22] PCT Filed: Oct. 31, 1991

[86] PCT No.: PCT/JP91/01495

§ 371 Date: Jun. 18, 1992

§ 102(e) Date: Jun. 18, 1992

[87] PCT Pub. No.: WO92/08570

PCT Pub. Date: May 29, 1992

[30] Foreign Application Priority Data

Nov. 13, 1990 [JP] Japan .................. 2-306683

[51] Int. Cl.⁵ .................................. B23K 26/00
[52] U.S. Cl. .................. 219/121.61; 219/121.62
[58] Field of Search ............ 219/121.61, 121.62, 219/121.6, 121.85, 121.67, 121.72, 121.84, 121.74, 121.63, 121.64; 372/9, 14, 19

[56] References Cited

U.S. PATENT DOCUMENTS

4,087,766  5/1978  Mohler ........................ 372/9
5,033,054  7/1991  Scifres et al. ............. 372/19 X

FOREIGN PATENT DOCUMENTS

55-109587  8/1980  Japan .
60-119786  6/1985  Japan ................. H01S 3/11
3161984    7/1991  Japan ................. H01S 94

OTHER PUBLICATIONS

Gagliano, et al. Laser Beam Welder, Western Electric Technical Digest No. 36 pp. 11 and 12, Oct. 1974.

*Primary Examiner*—C. L. Albritton
*Attorney, Agent, or Firm*—Staas & Halsey

[57] ABSTRACT

A laser beam machine for carrying out a machining operation by converging a laser beam emitted from a laser resonator and irradiating the converged laser beam onto a workpiece. A beam interceptor (21) is arranged across a light path extending from a total reflection mirror (2) of the laser resonator (1) to a surface of the workpiece (5) and has a small inertia, and the position thereof is controlled at a high speed to permit the passage of the laser beam and to intercept the laser beam. The beam interceptor (21) is controlled in such a manner that the laser beam is allowed to pass during a full-scale discharge and is intercepted during a seed discharge. Accordingly, even if a seed discharge exists while a high-reflectivity material, for example, is machined, a laser oscillation of a composite resonator including the workpiece (5) can be reliably prevented.

4 Claims, 4 Drawing Sheets

LASER BEAM MACHINE

TITLE OF THE INVENTION

BACKGROUND OF THE INVENTION

1. Field of the Invention

This invention relates to a laser beam machine for machining materials, and more particularly, to a laser beam machine using a high-output power $CO_2$ laser for machining high-reflectivity metals.

2. Description of the Related Art

Current $CO_2$ lasers have an increased output, and thus are widely used for machining materials or the like.

FIG. 3 is a schematic diagram illustrating the arrangement of a conventional laser beam machine. As shown in the figure, a laser resonator 1 is composed of a total reflection mirror 2 and an output coupling mirror 3, and a laser beam emitted from the laser resonator 1 is focused onto a surface of a workpiece 5 by a light focusing lens 4.

An excitation means for such a laser resonator will be now explained,

FIG. 4(a) and FIG. 4(b) are diagrams illustrating the excitation means for a laser resonator, wherein FIG. 4(a) shows a seed discharge state of the laser resonator, and FIG. 4(b) shows a full-scale discharge state.

Gas lasers utilize an electric discharge for feeding energy into the laser resonator 1; for such a discharge, a high-frequency discharge (RF discharge) is used.

To turn the laser beam on and off at a high speed, the discharge must be switched on and off, and to carry out this operation without the occurrence of an erroneous shot, the discharge is not totally shut-down, but is partly retained in the form of a seed discharge 10, and a full-scale discharge 11 is developed from the seed discharge 10.

The level of such a seed discharge 10 is preferably maintained at as high a level as possible, to ensure a stability of the discharging operation, but if the discharge level becomes too high, a laser output occurs and the surface of the workpiece 5 is damaged. Although this drawback can be eliminated by lowering the level of the seed discharge 10, this can lead to an unstable operation. This can be prevented by maintaining a high level of the seed discharge 10 and reducing the reflectivity of the output coupling mirror 3, but in this case an optimum design of the laser resonator cannot be obtained.

Further, where the material of the workpiece 5 has a high reflectivity (e.g., aluminum, copper, brass, or stainless steel), there is no optimum design capable of suppressing a laser oscillation during the seed discharge, because the total reflection mirror 2, the output coupling mirror 3, the light focusing lens 4, and the surface of the workpiece 5 together form a kind of composite resonator. Namely, if the total reflection mirror 2 and the surface of the workpiece 5 have a reflectivity close to 100%, the value of Q of the composite resonator is increased, and thus the laser oscillation cannot be eliminated regardless of at how low a level the seed discharge is maintained. This is because the focus of the light focusing lens 4 is located on the surface of the high-reflectivity workpiece 5, and therefore, almost 100% of the laser beam output is returned to the laser resonator.

If the above-mentioned phenomenon occurs during a cutting operation, an unwanted scratch is formed on the workpiece 5 upon a machine transfer from a cut portion to a next portion to be cut.

Conventionally, when a laser oscillation occurs in the composite resonator, an external shutter is operated for interception, but this external shutter has large inertia and is unable to follow the on and off cycle of the high-frequency discharge, and thus the machining speed is lowered.

SUMMARY OF THE INVENTION

This invention was created in view of the above circumstances, and an object thereof is to provide a laser beam machine capable of reliably preventing a laser oscillation during a seed discharge.

To achieve the above object, this invention provides a laser beam machine for carrying out a machining operation by converging a laser beam emitted from a laser resonator and irradiating the converged laser beam onto a workpiece, the machine comprising a beam interceptor arranged across a light path extending from a total reflection mirror of the laser resonator to a surface of the workpiece, the beam interceptor having a small inertia and a position thereof being controlled at a high speed to permit the laser beam to pass along the light path during a full-scale discharge and to intercept the laser beam during a seed discharge.

The beam interceptor having a small inertia is arranged across the light path extending from the total reflection mirror of the laser resonator to the surface of the workpiece, and the position thereof is controlled at a high speed to allow the passage of the laser beam and to intercept the laser beam. This beam interceptor is controlled in such a manner that the laser beam is allowed to pass during a full-scale discharge and is intercepted during a seed discharge. Accordingly, even if a seed discharge exists during a machining of a high-reflectivity material, for example, a laser oscillation of the composite resonator can be reliably prevented.

DESCRIPTION OF THE PREFERRED EMBODIMENTS

An embodiment of this invention will be described with reference to the drawings.

Figure 1:
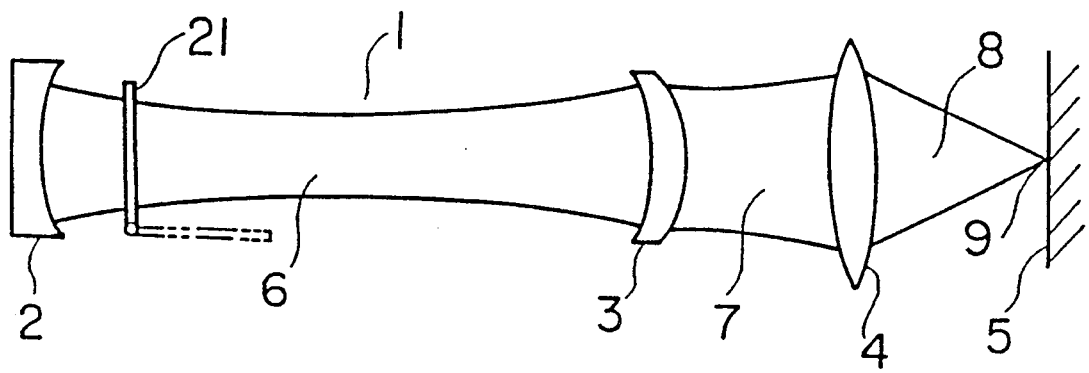
FIGS. 1(a), 1(b) and 1(c) are schematic diagrams illustrating the arrangement of a laser beam machine according to this invention.
Figure 1:
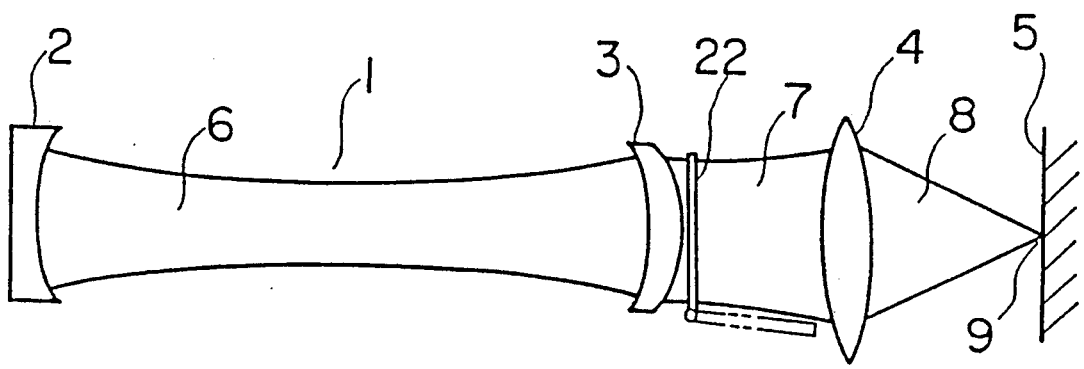
Figure 1:
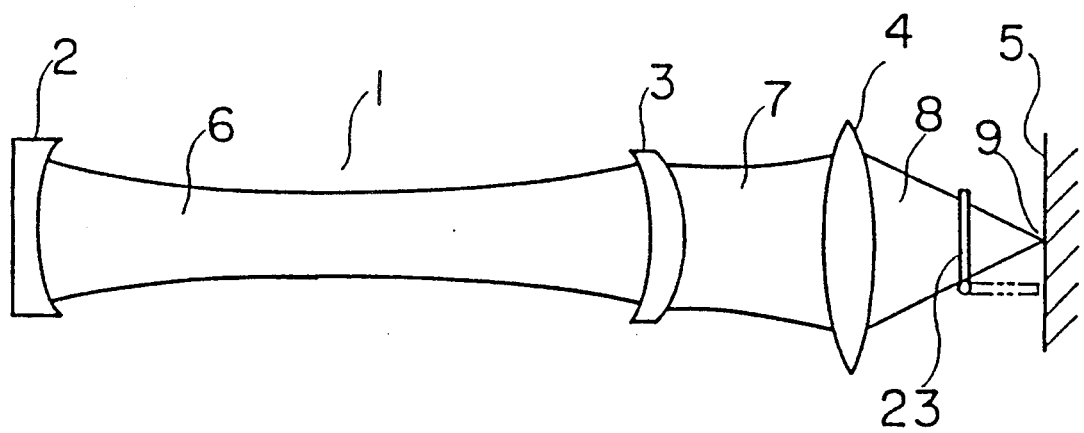

FIGS. 1(a), 1(b), and 1(c) are schematic diagrams showing the arrangement of a laser beam machine according to this invention, wherein FIG. 1(a) shows a case in which a beam interceptor is arranged inside a laser resonator, FIG. 1(b) shows a case in which the beam interceptor is arranged in front of a light focusing lens, and FIG. 1(c) shows a case in which the beam interceptor is arranged at the rear of the light focusing lens.

As shown in the figures, a laser resonator 1 is composed of a total reflection mirror 2 and an output coupling mirror 3. A resonance of a laser mode 6 occurs in the laser resonator 1, due to a high-frequency discharge, and thus a laser beam 7 is emitted to the outside of the laser resonator 1. The laser beam 7 is converged by a light focusing lens 4, and the thus-converged beam 8 is focused at a point 9 on a surface of a workpiece 5.

Beam interceptors 21, 22 and 23 each have a small inertia, and accordingly, can be operated at a high speed, and are arranged so as to be movable into and away from a light path between the total reflection mirror 2 and the workpiece 5. Namely, the positioning of each beam interceptor is controlled at a high speed in accordance with an on and off switching of the high-frequency discharge. When the high-frequency discharge is on, a full-scale discharge occurs, and in this case each beam interceptor is shifted to a position indicated by the broken lines in the figures. When the high-frequency discharge is off, a seed discharge occurs, and in this case each beam interceptor is located at a position indicated by the solid lines in the figures.

As a result, the value Q of a composite resonator constituted by the elements between the total reflection mirror 2 and the workpiece 5 can be controlled. Namely, during a seed discharge, the light path is intercepted, whereby the value Q of the composite resonator is reduced, and thus a laser oscillation is prevented.

In this embodiment, the beam interceptors 21, 22 and 23 can be shifted into and out of the light path, as mentioned above, and therefore, even if a seed discharge exists while a high-reflectivity material, for example, is machined, a laser oscillation of the composite resonator can be reliably prevented. Therefore, a scratch on the surface of the workpiece 5, otherwise caused during a transfer by the conventional machine, is prevented.

Further, it is not necessary to provide the external shutter conventionally employed for restraining a laser oscillation of the composite resonator, and thus the machining speed is increased.

The beam interceptors 21, 22 and 23 serve to prevent the laser oscillation itself, and do not absorb a laser beam. Accordingly, the beam interceptors may have a small thermal capacity, and the weight thereof may be made as low as possible, to reduce the inertia thereof so that the beam interceptors can be operated at high speeds. Moreover, the beam interceptors are preferably made of a reflective material, rather than an absorptive material, to thereby reduce possible damage thereto.

In FIG. 1(a), the beam interceptor 21 is arranged inside the laser resonator 1 and at the rear of the total reflection mirror 2. In this case, the laser oscillation during a seed discharge can be suppressed at a location near the source thereof, and thus can be reliably eliminated. Further, the laser oscillation can be suppressed even if the intensity of the seed discharge is set to a high level, and therefore, the stability of the discharging operation is enhanced.

In FIGS. 1(b) and 1(c), the beam interceptors 22 and 23 are arranged, respectively, in front of and at the rear of the light focusing lens 4. In this case, the beam interceptors 22 and 23 are arranged in the atmosphere, and therefore, unlike the case of FIG. 1(a) in which the beam interceptor is arranged in a vacuum, the mechanical portion can be easily constructed. This arrangement, however, requires a proper setting of conditions (e.g., the seed discharge intensity and the reflectivity of the output coupling mirror) for suppressing the laser oscillation in the laser resonator during a seed discharge. Such a setting can be accomplished by using conventional techniques.

Figure 2:
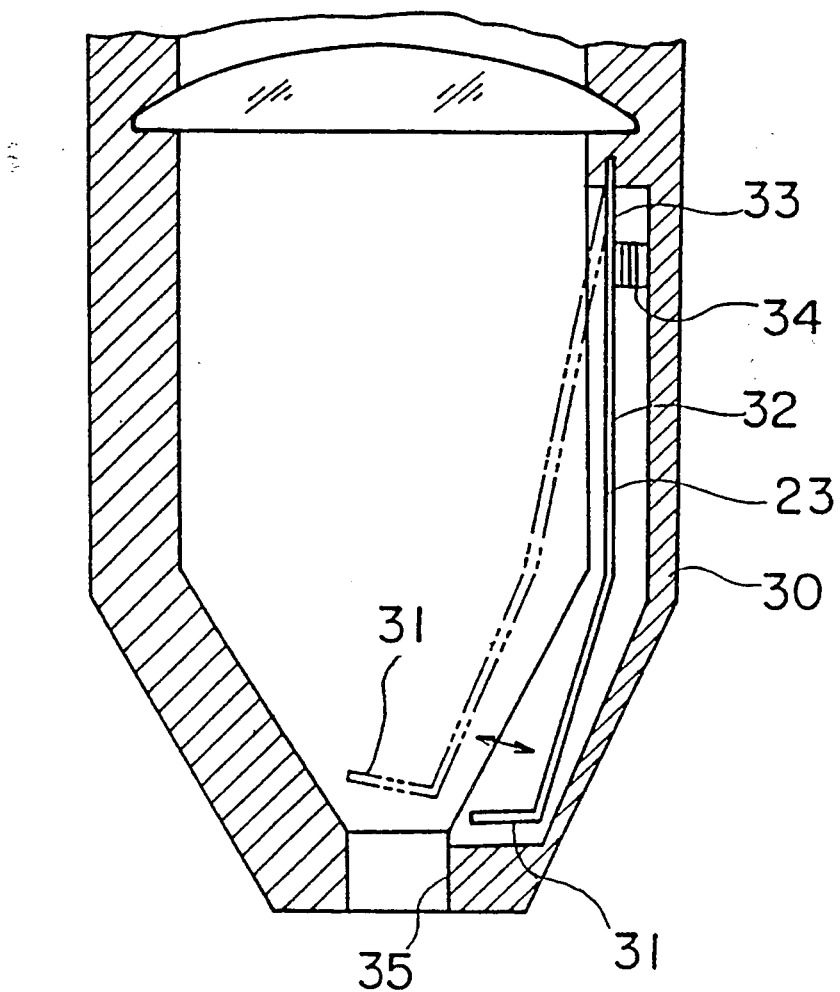
FIG. 2 is a view showing the arrangement of a beam interceptor in FIG. 1(c)
Figure 3:
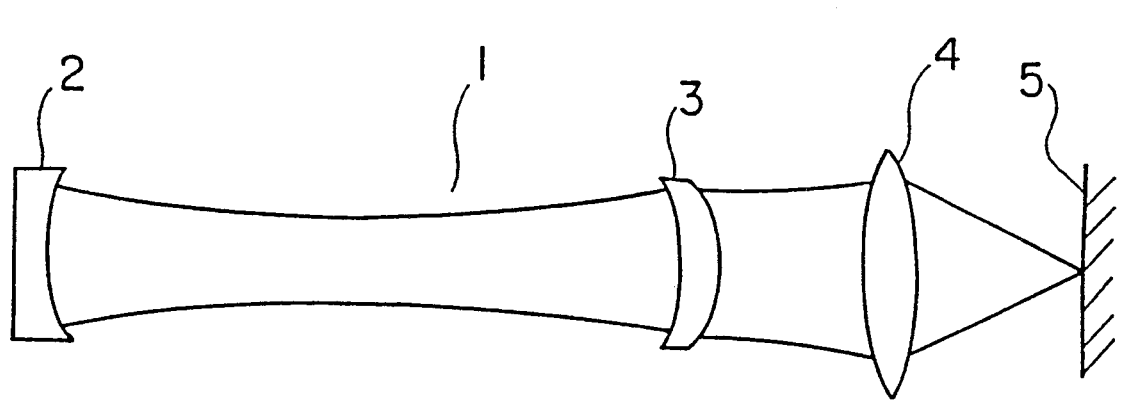
FIG. 3 is a schematic diagram showing the arrangement of a conventional laser beam machine.
Figure 4:
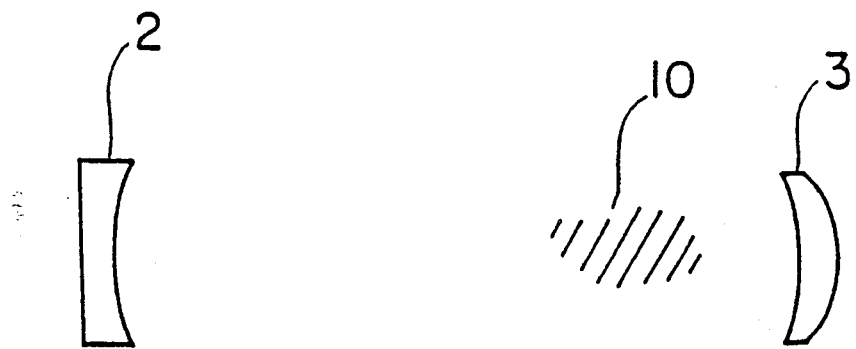
FIGS. 4(a) and 4(b) are diagrams illustrating an excitation means of a laser resonator.
Figure 4:
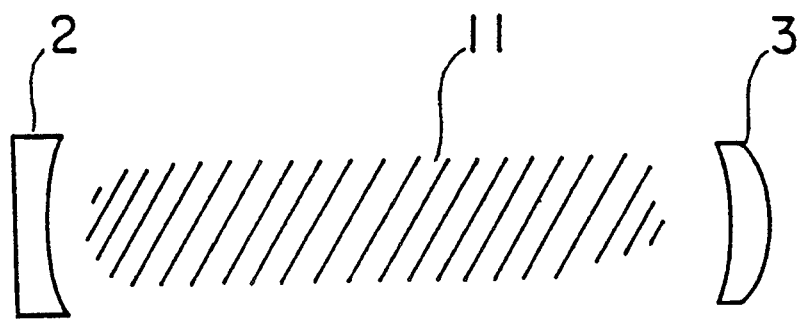

FIG. 2 shows the arrangement of the beam interceptor 23 schematically shown in FIG. 1(c). The beam interceptor 23 is arranged inside a light converging nozzle 30, and comprises a shutter 31, an arm 32, and a spring A piezoelectric element 34 is arranged in the vicinity of the spring 33, and has a sufficiently high response that it can be controlled in accordance with the on and off cycle of the high-frequency discharge. The beam interceptor 23 is controlled in accordance with the actuation of the piezoelectric element 34, and accordingly, the shutter 31 of the beam interceptor 23 shields and opens a nozzle opening 35 at the distal end of the light converging nozzle 30. Since the diameter of the nozzle opening 35 is small, the distance over which the shutter 31 is moved also may be small (e.g., 5 mm), which is desirable for a high-speed operation of the beam interceptor 23.

As described above, according to this invention, the beam interceptor is arranged such that it can be shifted into and away from the light path, and accordingly, even if a seed discharge exists while a high-reflectivity material, for example, is machined, a laser oscillation of the composite resonator can be reliably prevented. Therefore, a scratch on the surface of the workpiece, which often occurs during a transfer by the conventional machine, is eliminated.

Further, it is not necessary to provide an external shutter conventionally employed for suppressing the laser oscillation of the composite resonator, and thus the machining speed can be increased.

Furthermore, by arranging the beam interceptor inside the laser resonator, it is possible to suppress the laser oscillation during a seed discharge, at a location near the source thereof. Accordingly, even if the seed discharge is set to a high level, the laser oscillation can be suppressed and the stability of the discharging operation enhanced.

We claim:

1. A laser beam machine for carrying out a machining operation by converging a laser beam emitted from a laser resonator and irradiating the converged laser beam onto a workpiece, the machine comprising:

a beam interceptor arranged across a light path extending from a total reflection mirror of the laser resonator to a surface of the workpiece, the beam interceptor having a small inertia; and means for controlling a position of the beam interceptor at a high speed based on an electric discharge that feeds energy into the laser resonator, said electric discharge including a full-scale discharge and a seed discharge, to permit the laser beam to pass along the light path during the full-scale discharge and to intercept the laser beam during the seed discharge.

2. A laser beam machine according to claim 1, wherein the beam interceptor is arranged inside the laser resonator.

3. A laser beam machine according to claim 1, wherein the beam interceptor is arranged between the laser resonator and the workpiece.

4. A laser beam machine according to claim 1, wherein the means includes a piezoelectric element.

* * * * *